United States Patent Office 3,497,378
Patented Feb. 24, 1970

3,497,378
METHOD OF MAKING A REFLEXIBILIZABLE RIGID GLASS FABRIC STRUCTURE
Seymour Schwartz, Los Angeles, Leon Brian Keller, Palos Verdes Peninsula, and William K. Johnson, Inglewood, Calif., assignors to the United States of America as represented by the Secretary of the Air Force
No Drawing. Filed May 31, 1966, Ser. No. 554,948
Int. Cl. C03c 25/02
U.S. Cl. 117—62.1      2 Claims

ABSTRACT OF THE DISCLOSURE

A method of making a rigidized glass fabric structure flexible consisting of the steps of impregnating a glass fabric with a carbamidated or cyanamidated gelatin solution, drying said fabric structure and then reflexibilizing same by dipping in a water solution of formaldehyde. These structures are useful for erection, rigidization and reflexibilization under space conditions.

---

This invention relates to a gelatin impregnated fiberglass material and to the method by which it is fabricated.

In the past, various fibers have been impregnated with various bonding materials that on being shaped and hardened are caused to retain their assumed contour for various periods of useful service. As compared with the polyester system, polyurethane material and other earlier impregnating materials, the gelatin system here of interest is the newest and appears to offer the most promise in ultimate reliability and simplicity, in easier processing and in lighter weight. Gelatin may be considered as a leading space rigidization system material since it will rigidize without any activation means other than the vacuum of space at a rate that is a function of temperature and of the thickness of the material that is to be rigidized. The gelatin system offers high strength, high stiffness, and unlimited storage life.

The objects of the present invention are to provide a new and useful rigidization technique for integrally woven composite constructions.

A further object is to provide materials and methods for erecting and rigidizing under space conditions three dimensional fabric structures which may be of sewn or woven fiberglass and in single or sandwiched layer form, laminated or tubular.

Another object is to provide materials, consisting of peptized gelatin that is carbamidated or cyanamidated for preservation and that has been rigidized by solvent loss, and that remain in their initially erected configurations regardless of loss of internal pressure, maneuvering loads, etc.

A further object is to provide structures in a flexible, easily folded state, adapted to be packaged in small volumes as compared with their rigidized state.

A further advantage of the structures that are disclosed herein is their cyclic rigidized characteristic whereby they may be fabricated, packaged, rigidized for ground tests, reflexibilized, repackaged, rerigidized, reflexibilized, repackaged, etc.

Additional advantages attributable to the new structures that are contemplated hereby are their low cost, reliability, ease of preparation, and with minimum possibility of damage in space from moisture, ultraviolet, gamma rays, etc.

The rigid reinforced structures that embody the present invention illustratively comprise fabric made of fibers of glass that are impregnated with peptized gelatin.

The illustrative composition of the peptized gelatin mix solution consists of by weight.

| | Parts |
|---|---|
| Gelatin | 100 |
| Water | 150 to 200 |
| Thiourea | 17 to 21 |
| Wetting agent | .2 |
| Fungicide | .1 | with or without as additives phenol formaldehyde and the like.

The gelatin is carbamidated or is cyanamidated since it is a jelly extracted from animal protein, bone and cartilage, and is to be protected from bacterial cultures and the like. For this purpose, suggested additives are phenol formaldehyde or methylol phenol, urea formaldehyde, and the like.

Peptizing agents, such as the thiourea in the above composition, include urea, ammonium thiocyanate, zinc chloride, calcium nitrate, and the like. Peptizing agents also are added to the gelatin solution for the purpose of prolonging the liquefaction. Peptizing agents serving this purpose include thiourea, calcium nitrate, zinc chloride and ethylene chlorohydrin, all of which prevent gelation if used in sufficient minimum quantities. Excessive quantities weaken the gelatin structure.

Ethylene chlorohydrin and thiourea are added directly to the solution and calcium nitrate is added as three parts salt and one part water solution. Varying parts of each peptizer were added to gelatin samples until a solution was obtained which would remain liquid for approximately one hour at room temprature. The final results of these tests are shown below:

| Peptizing agent: | Percent by weight |
|---|---|
| Ethylene chlorohydrin | 20 |
| Thiourea | 7 |
| Calcium nitrate solution | 15 | with the development of the 7% thiouret peptizing system, a satisfactory gelatin solution has ben developed.

A preferred wetting agent bears the trade name CF–21 which is a liquid, anhydrous, nonionic alkyl aryl polyether. The best wetting agent tested with two-inch glass fabric disks was 0.1 to 0.2 weight percent of Triton X–100 which is water soluble isooctyl phenoxy polyethoxy ethanol.

The solution is maintained at a temperature of about 115–150° F.

An impregnated structure is kept soft for handling during fabrication and storage in a very compact package. On deployment, the structure should be capable of expansion and erection with a minimum of effort. This plasticization is accomplished by storage in a sealed container of controlled water vapor atmosphere wherein the parts remained flexible for at least eight weeks. The plasticization also may be accomplished by the retention within the container of a plasticizer with an adequately high vapor pressure of which ethylene glycol and glycerine are representatives.

Initial impregnation of fabric strips is accomplished by drawing the strips through a solution of 20% glycerine in water with an illustrative 50 to 60% pickup. The fabric also may be dip coated and then run through squeeze rolls for uniform impregation.

Impregnation techniques by drawing samples through the above-defined warm gelatin solution favored about a five-minute immersion of the sample. Resin content determinations made by ignition indicate an average resin content of 57.3% with a variation of ±6%.

The gelatin solution preferably is applied to a desired fabric structure by brush, dip, or roller squeeze technique, with the removal of excess solution for uniform impregnation.

The fabric standard drying time worked out was 24 hours vacuum drying at 1 to 0.1 millimeter of mercury pressure.

In the obtaining of information on drying times, resin content, erection techniques, etc., tests indicated that resin contents from 30 to 50% may be obtained in the dip process of applying the gelatin composition with good rigidity in the final part.

The key to successful storage was found to be a minimum water vapor atmosphere.

For flexibilizing, the hardened impregnated material was accomplished by contact with water or with water vapor.

The structure is reflexibilized or is insolubilized using a mixture of water and formaldehyde that is composed typically of the proportions:

| | Parts by weight |
|---|---|
| Formaldehyde (37%) | 2 to 10 |
| Water | 98–90 |

Other crosslinking agents which may be used in the same manner are paraformaldehyde, hexamethylmelamine, hexamethylenetetramine, glyoxal, isocyanates, and other additives, that are capable of reacting with the amine or the hydroxyl functional group in the gelatin.

The reflexibilization treatment may be conducted (first) by dipping the structure in a cold (<50° F.) water-formaldehyde solution, or (second) by maintaining the structure in a closed container in a water-formaldehyde vapor saturated atmosphere.

The latter treatment may be conducted at room temperature or at an elevated temperature. The times of exposure may vary from approximately one hour for the dip treatment to several days in the vapor phase treatment. For minimum tackiness it is necessary to use multiple treatments with short drying periods between them.

After reflexibilization, the structure is lightly coated with a parting agent such, for example, as the mixture of 1 part DC–200 silicone oil, and 1 part kerosene; wax emulsions, vegetable oils, etc. DC–200 is a dimethyl siloxane polymer.

In making determinations of the resin content of thiourea peptized solutions, the first impregnated samples were considerably below the desired 40% resin content. A procedure was established for obtaining a 40±5% resin content.

Homogeneous impregnation presented a problem. The use as peptizing agent of methyl butynol and methyl pentynol in amounts up to 30% by weight of each were confirmed experimentally. Use of a 7% thiourea peptizing system was approved as a satisfactory gelatin solution. At room temperature of about 72–74° F. the fabric samples were dip coated in the approved gelatin solution, run through squeeze rolls to accomplish uniform impregnation of substantially uniform characteristics. The stickiness and solution of the resin is inhibited by the use of the crosslinking agent.

It is to be understood that the gelatin solution composition that is disclosed herein and the disclosed method of its use as an impregnant in glass fiber material and the like, are subject to modification in both composition and uses without departing from the preferred form of the invention that is disclosed herein.

We claim:
1. A method of making a normally rigid composite article which is flexible for storage in a relatively small container comprising the steps of
   (1) impregnating a glass fabric structure with a mixture consisting of
      (a) 100 parts by weight of carbamidated or cyanamidated gelatin,
      (b) 150 to 200 parts by weight of water,
      (c) 0.2 parts by weight of water-soluble iso-octyl phenoxy polyethoxy ethanol,
      (d) 0.1 part by weight of a fungicide, and the remainder being,
      (e) a peptizing agent selected from the group consisting of thiourea, methyl butynol, and methyl pentynol.
   (2) drying the structure and
   (3) reflexibilizing said structure by dipping the structure for about one hour at a temperature of less than 50° F. in a solution of formaldehyde and water, said solution containing two to ten parts by weight of 37 percent formaldehyde.

2. The method of claim 1 in which the peptizing agent consists of 17 to 21 parts by weight of thiourea.

References Cited

UNITED STATES PATENTS

| 1,394,654 | 10/1921 | Tressler | 106—136 |
| 1,922,767 | 8/1933 | Humphner. | |
| 2,371,933 | 3/1945 | Steinbock | 117—126 X |
| 2,652,345 | 9/1953 | Jones | 117—62.2 |
| 2,979,422 | 4/1961 | Bersin et al. | 117—62.1 |
| 3,152,003 | 10/1964 | Exchaquet | 117—62.2 X |

FOREIGN PATENTS

| 5,228 | 3/1900 | Great Britain. |
| 202,404 | 8/1923 | Great Britain. |
| 415,256 | 8/1934 | Great Britain. |

WILLIAM D. MARTIN, Primary Examiner

M. R. LUSIGNAN, Assistant Examiner

U.S. Cl. X.R.

117—126, 164